Oct. 30, 1951 A. COTSWORTH, III 2,573,248

TELEVISION RECEIVER

Filed June 18, 1949 2 SHEETS—SHEET 1

ALBERT COTSWORTH III
*INVENTOR.*

BY Francis W. Crotty

HIS ATTORNEY

Oct. 30, 1951 A. COTSWORTH, III 2,573,248

TELEVISION RECEIVER

Filed June 18, 1949 2 SHEETS—SHEET 2

ALBERT COTSWORTH III
*INVENTOR.*

BY Francis W. Crotty
HIS ATTORNEY

Patented Oct. 30, 1951

2,573,248

UNITED STATES PATENT OFFICE 2,573,248

TELEVISION RECEIVER

Albert Cotsworth, III, Oak Park, Ill., assignor to Zenith Radio Corporation, a corporation of Illinois Application June 18, 1949, Serial No. 99,953

4 Claims. (Cl. 179—171)

Figure 1:
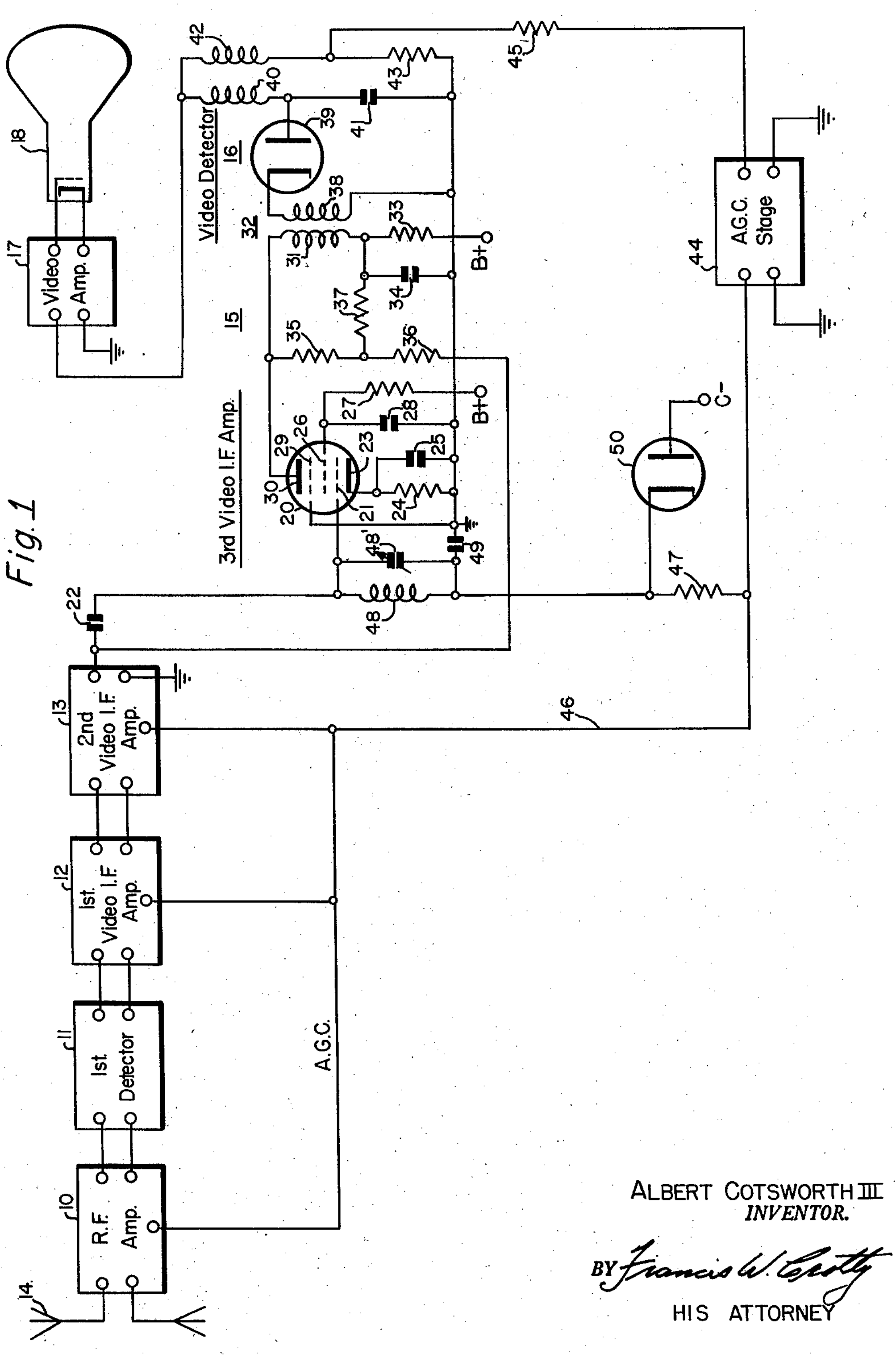

This invention relates to television receivers and more particularly to a television receiver in which an automatic control circuit is utilized to enable the receiver to reproduce the image intelligence contained in television signals of a wide range of signal strengths.

In present-day television systems, the principle of vestigial sideband transmission is used so that the channel requirements of the transmitted signal may be as narrow as possible. In such a signal the video carrier-wave has but a single sideband except for the sidebands in close proximity with the carrier-wave which represent certain low-frequency components of the video signal, and as to these components both the upper and lower sidebands are included. It is necessary, therefore, that a television receiver utilizing such a signal be so constructed that its intermediate-frequency amplifier amplifies the television signal with its double sideband portion attenuated relative to its single sideband portion in order to produce the effect of equal response to all components of the picture signal, so that the image represented by these components may be reproduced by the receiver with full picture detail. To accomplish this, the intermediate-frequency amplifier is made frequency selective and has a response characteristic with an intermediate portion of substantially uniform maximum response and an end portion of decreasing response. The amplifier is so constructed that the video intermediate-frequency carrier lies in this end portion, and this carrier and its double sideband components are thereby translated by the amplifier attenuated relative to the single sideband components. This results in insufficient amplification of the carrier and the receiver is capable of reproducing only relatively strong received signals.

The present invention provides a television receiver which utilizes an automatic control circuit to vary the width of the uniform maximum response portion of the amplifier characteristic inversely with the strengths of the received television signals. The circuit is so arranged that the intermediate-frequency carrier-wave of any received television signal above a certain predetermined strength lies in the decreasing response end portion of the receiver characteristic, as in the afore-described present-day type of television receiver. However, when a television signal below this predetermined strength is received the circuit acts to broaden the uniform maximum response portion of the amplifier characteristic so that the intermediate-frequency carrier-wave of this weak signal lies in the maximum response portion of the characteristic and not in the end portion as was the case for the stronger signals.

In this manner, signals below the predetermined strength have their carriers translated by the amplifier with substantially no attenuation relative to its single-sideband components and the overall response of the receiver to these weak signals is materially increased. In this condition, the single-sideband components have the effect of being attenuated relative to the double-sideband components of the translated signal since the amplifier responds equally to all components of the signal, and some detail is lost in the reproduced image. However, when the received signal is weak and the signal-to-noise ratio is low, the improved effective signal-to-noise ratio realized by the action of the automatic control circuit more than compensates for the loss in picture detail in the reproduced image.

It is accordingly an object of this invention to provide an improved television receiver capable of reproducing satisfactory images from the intelligence contained in television signals of a wide range of signal strengths.

Another object of this invention is to provide an improved television receiver which utilizes an automatic control circuit to alter the characteristics of the receiver in response to the signal strengths of the received signals to enable the receiver to reproduce satisfactory images from the intelligence contained in relatively weak television signals to which the receiver would otherwise be insensitive.

Figure 3:
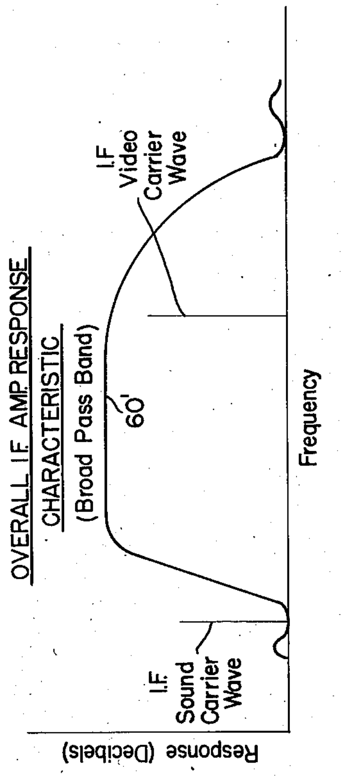
Figure 2:
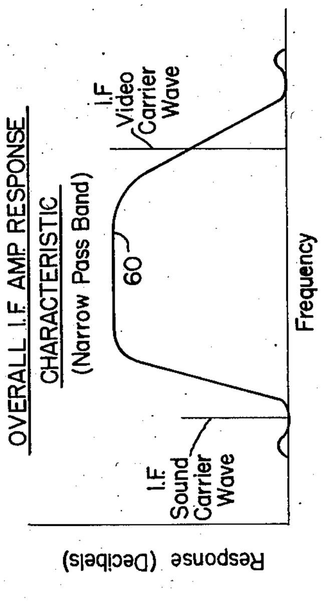

The features of this invention which are believed to be new are set forth with particularity in the appended claims. The invention itself, however, together with further objects and advantages thereof, may best be understood by reference to the following description when taken in conjunction with the accompanying drawing in which:

Figure 1 shows a television receiver incorporating the automatic control circuit of the invention, and Figures 2 and 3 show various curves useful in the understanding of the invention.

The television receiver of Figure 1 includes the usual radio-frequency amplifier 10, first detector 11 and first and second video intermediate-frequency amplifiers 12 and 13. The radio-frequency amplifier 10 may be connected to a suitable antenna 14, and the output terminals of the intermediate-frequency amplifier 13 are coupled to a third intermediate-frequency amplifier 15.

The output circuit of intermediate-frequency amplifier 15 is connected to a video detector 16 which, in turn, is coupled to a video amplifier 17. The output terminals of the video amplifier 17 are connected to the control electrode and cathode of an image reproducing device 18.

The afore-described portion of the receiver, except for amplifier stage 15, is quite conventional. The radio-frequency amplifier 10 and the first detector 11 may be tuned to receive and amplify a television signal intercepted by the antenna 14. This signal is amplified in the radio-frequency amplifier 10, which may have one or more stages, and is heterodyned to the selected intermediate frequency of the receiver in the first detector 11. The resulting intermediate-frequency signal is amplified in the intermediate-frequency amplifier stages 12, 13 and 15, three stages of intermediate frequency amplification being shown merely by way of example. The amplified intermediate-frequency signal from the amplifier 15 is detected in the video detector 16 and the resulting video signals are amplified in the video amplifier 17, which may have one or more stages. The amplified video signals are supplied to the device 18 to control the intensity of the electron beam therein in well-known fashion.

The synchronizing system and sound system of the television receiver form no part of the present invention and for that reason have not been shown.

The intermediate-frequency amplifier 15 embodies the present invention and includes an electron-discharge device 20. One of the output terminals of the intermediate-frequency amplifier 13 is connected to ground, and the other is coupled to the control electrode 21 of this device through a coupling capacitor 22. The cathode 23 of the device 20 is connected to ground through a resistor 24, this resistor being by-passed by a capacitor 25. The screen electrode 26 of the device 20 is connected to the positive terminal B+ of a source of unidirectional potential, not shown, through a resistor 27, this screen electrode being by-passed to ground through a capacitor 28. The suppressor electrode 29 of the device 20 is connected to ground. The anode 30 of the device 20 is connected to the positive terminal B+ of a unidirectional potential source through the primary winding 31 of a coupling transformer 32 and a series-connected resistor 33. The resistor 33 is by-passed to ground by a capacitor 34. The anode 30 is also connected to the input circuit of the device 20 by means of a feedback network including series-connected resistors 35 and 36. The junction of the resistors 35 and 36 is connected through a resistor 37 to the junction of resistor 33 and capacitor 34.

One terminal of the secondary winding 38 of transformer 32 is grounded and the other terminal thereof is connected to the cathode of a unilateral conductive device 39. The anode of the device 39 is coupled to the ungrounded input terminal of the video amplifier 17 through an inductance coil 40 and by-passed to ground through a capacitor 41. The inductance coil 40 is connected to a second inductance coil 42 which, in turn, is connected to ground through a resistor 43. The network 41—43 forms a usual filter network commonly used in video detector circuits for removing the intermediate-frequency component of the signal supplied to the video amplifier 17. The junction of the coil 42 and resistor 43 is connected to one of the input terminals of an automatic gain control stage 44 through a resistor 45, the other input terminal of this stage being grounded. The stage 44 may be of any well-known type and develops a negative control potential having amplitude variations dependent upon the strengths of the signals translated by the receiver.

The automatic gain control stage 44 is connected to the amplifiers 10, 12 and 13 of the receiver by way of lead 46. The lead 46 is further connected to the control electrode 21 of the device 20 through a resistor 47 and inductance coil 48. The coil 48 and shunt-connected capacitor 48′ form a tuned circuit for coupling the amplifier 15 to the amplifier 13. The junction of the resistor 47 and coil 48 is by-passed to ground through a capacitor 49, and the junction is further connected to the cathode of a unilateral conductive device 50. The anode of the device 50 is connected to the negative terminal C— of a source of unidirectional biasing potential, not shown.

The negative control potential developed by the automatic control circuit 44 is supplied to the control electrodes of the electron-discharge devices included in the amplifiers 10, 12, and 13 to control the bias on these electrodes. In this manner, the gain of these amplifiers is made of function of the relative amplitudes of the incoming television signals to which the receiver may be tuned.

The video intermediate-frequency amplifier 15 is made degenerative by reason of the negative feed-back circuit comprised of the resistors 35, 36 and 37. Due to the characteristics of negative feedback amplifiers, a change in the bias on the control electrode 21 does not materially affect the gain of this stage but does alter the band-pass characteristics thereof. More particularly, any increase in the bias potential of such an amplifier decreases the acceptance band, whereas a reduction in the bias has the opposite effect and increases the acceptance bandwidth. Consequently, when weak television signals are received by the receiver, the negative automatic gain control potential developed by the circuit 44 is of relatively low amplitude, and this control potential which is supplied to the control electrode 21 through the resistor 47 act to broaden the acceptance band of the amplifier 15. However, for stronger signals the negative control potential increases and the band-pass of the amplifier 15 is accordingly narrowed.

The device 50 connected in shunt with respect to resistor 47 functions as a limiter to limit the maximum value of the automatic-gain control potential applied to the amplifier 15 to a preselected level determined by the potential source C— which, in turn, establishes a bias on the device. Whenever the control potential from the automatic-gain-control stage 44 exceeds the bias from source C—, the device 50 becomes conductive. Consequently, the control potential as applied to amplifier 15 cannot exceed to any appreciable amount the value which causes the limiting device to conduct. In practice, the bias of the device 50 is so chosen that limiting occurs during reception of any signal that has at least a medium signal strength.

Figure 2 shows the overall band-pass characteristics of the intermediate-frequency amplifier stages 12, 13, and 15 during the reception of signals above a predetermined signal strength. During the reception of these signals the device 50 is conductive and limits the bias on the control electrode 21 of the device 20 to a preselected maximum value. Under these conditions, the overall response of the intermediate-frequency amplifier stages 12, 13, and 15 is frequency selective and has a characteristic similar to the characteristic of the intermediate-frequency amplifier in a usual present-day television receiver. The overall frequency response curve 60 of the present amplifiers has, in this condition, an intermediate portion of uniform maximum response and an end portion of decreasing response, and the amplifiers are so constructed that the video intermediate-frequency carrier lies in this end portion. Therefore, the video carrier and its double-sideband components are translated by the amplifiers attenuated relative to the single-sideband components. For complete picture detail, the video carrier-wave lies in this end portion at a point of approximately one-half the maximum response of the amplifier.

Figure 3 shows the overall band-pass characteristics of the intermediate-frequency amplifier stages 12, 13, and 15 during the reception of a television signal below the predetermined signal strength. During the reception of this signal the device 50 is non-conductive and the bias on the control electrode 21 of device 20 is determined by the control potential developed by the automatic-gain-control stage 44. The bias on control electrode 21 is less than during reception of strong signals and this tends to broaden the intermediate maximum portion of the overall response curve 60′ of the amplifiers. The video intermediate-frequency carrier in this condition no longer lies in the end portion of the characteristic of decreasing response, but in the intermediate portion of maximum uniform response.

The overall response of the amplifiers in the latter condition is no longer frequency-selective, and the video intermediate frequency carrier and all its sideband components are translated thereby with maximum amplification. The intermediate-frequency signal now produced in the output circuit of the amplifiers has its single-sideband components in effect attenuated relative to its double-sideband components since the receiver responds equally to all the components. As previously mentioned, this tends to distort slightly the image reproduced by the receiver. However, the improved signal-to-noise ratio of the signal more than compensates for this effect, and satisfactory images may be reproduced by the device 18 from weak television signals to which the receiver would otherwise be insensitive.

It is desirable that the action of the control potential on the characteristic of the amplifier 15 does not materially affect the overall low frequency response of the amplifier stages 12, 13, and 15 in order that the sound intermediate-frequency carrier-wave is never translated by the video intermediate-frequency channel. This may be accomplished by constructing the amplifier stages 12, 13, and 15 with individual predetermined staggered frequency-selective characteristics to produce the desired overall response characteristic. The frequency-selective characteristics of these stages may be such that alterations in the acceptance band of the amplifier 15 to which the control is applied, alters the overall response at the high frequency end only, as illustrated in Figures 2 and 3. In this manner, the sound carrier-wave is not translated by the stages 12, 13 and 15 regardless of whether their overall characteristics is as shown in Figure 2 or as shown in Figure 3.

This invention provides, therefore, an improved television receiver in which an automatic control circuit is provided that acts in the presence of weak television signals to broaden the acceptance band of the video intermediate-frequency amplifier so that the image intelligence contained therein may be satisfactorily reproduced by the receiver image tube.

While a particular embodiment of the invention has been shown and described, modifications may be made, and it is intended in the appended claims to cover all such modifications as fall within the true spirit and scope of the invention.

I claim:

1. A television receiver for utilizing modulated-carrier television signals of the vestigial sideband type subject to a wide range of signal strengths comprising: a frequency-selective amplifier having a response characteristic with an intermediate portion of substantially uniform maximum response and an end portion of decreasing response, said amplifier including an electron-discharge device having input and output circuits and further including a degenerative feedback network coupled between said input and output circuits; a control system for developing a control potential varying in amplitude with variations in the strength of the received television signals; a biasing network coupled between said input circuit and said control system for applying said control potential to said amplifier to vary the width of said intermediate portion of said characteristic inversely with the amplitude of said control potential; and a limiter for limiting said control potential as applied to said amplifier to a preselected maximum value for which the width of said intermediate portion is such that the carrier component of any one of said received television signals above a predetermined signal strength lies in said end portion.

2. A television receiver for utilizing modulated-carrier television signals of the vestigial sideband type subject to a wide range of signal strengths comprising: a frequency-selective amplifier having a response characteristic with an intermediate portion of substantially uniform maximum response and an end portion of decreasing response, said amplifier including an electron-discharge device having input and output circuits and further including a degenerative feedback network coupled between said input and output circuits; a control system for developing a control potential varying in amplitude with variations in the strength of the received television signals; a biasing network coupled between said input circuit and said control system for applying said control potential to said amplifier to vary the width of said intermediate portion of said characteristic inversely with the amplitude of said control potential; and a limiter coupled to said biasing network for limiting said control potential as applied to said amplifier to a preselected maximum value for which the width of said intermediate portion is such that the carrier component of any one of said received television signals above a predetermined signal strength lies in said end portion at a point of approximately one-half of said maximum response.

3. A television receiver for utilizing modulated-carrier television signals of the vestigial sideband type subject to a wide range of signal strengths comprising: a frequency-selective amplifier having a response characteristic with an intermediate portion of substantially uniform maximum response and an end portion of decreasing response, said amplifier including an electron-discharge device having input and output circuits and further including a degenerative feedback network coupled between said input and output circuits; a detector circuit coupled to said amplifier for detecting the signals amplified thereby; an automatic gain control circuit coupled to said detector for developing a control potential varying in amplitude with variations in the strength of the received television signals; a biasing network coupled between said input circuit and said control system for applying said control potential to said amplifier to vary the width of said intermediate portion of said characteristic inversely with the amplitude of said control potential; and a limiter coupled to said biasing network for limiting said control potential as applied to said amplifier to a preselected maximum value for which the width of said intermediate portion is such that the carrier component of any one of said received television signals above a predetermined signal strength lies in said end portion.

4. A television receiver for utilizing modulated-carrier television signals of the vestigial sideband type subject to a wide range of signal strengths comprising: a plurality of cascaded amplifier stages having an overall response characteristic with an intermediate portion of substantially uniform maximum response and an end portion of decreasing response, said amplifier stages individually including an electron-discharge device having input and output circuits and at least one of said stages including a degenerative feedback network coupled between said input and output circuits; a control system for developing a control potential varying in amplitude with variations in the strength of the received television signals; a biasing network coupled between said input circuit of said degenerative amplifier stage and said control system for applying said control potential to said amplifier to vary the width of said intermediate portion of said characteristic inversely with the amplitude of said control potential; and a limiter coupled to said biasing network for limiting said control potential as applied to said amplifier to a preselected maximum value for which the width of said intermediate portion is such that the carrier component of any one of said received television signals above a predetermined signal strength lies in said end portion.

ALBERT COTSWORTH, III.

REFERENCES CITED

The following references are of record in the file of this patent:

UNITED STATES PATENTS

| Number | Name | Date |
| --- | --- | --- |
| 2,144,224 | Koch | Jan. 17, 1939 |
| 2,216,998 | Farrington | Oct. 8, 1940 |
| 2,273,639 | Haantjes | Feb. 17, 1942 |
| 2,289,822 | Boucke | July 14, 1942 |